US009179192B1

(12) United States Patent
Ning et al.

(10) Patent No.: US 9,179,192 B1
(45) Date of Patent: Nov. 3, 2015

(54) ASSOCIATING VIDEO CONTENT WITH GEOGRAPHIC MAPS

(75) Inventors: Huazhong Ning, San Jose, CA (US); Hrishikesh Aradhye, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 33 days.

(21) Appl. No.: 13/561,981

(22) Filed: Jul. 30, 2012

(51) Int. Cl.
*H04H 60/33* (2008.01)
*H04N 21/472* (2011.01)
*H04N 21/4725* (2011.01)

(52) U.S. Cl.
CPC ......... *H04N 21/472* (2013.01); *H04N 21/4725* (2013.01)

(58) Field of Classification Search
USPC ................. 725/9, 32; 701/410, 523
See application file for complete search history.

(56) References Cited

U.S. PATENT DOCUMENTS

2008/0059997 A1* 3/2008 Plotnick et al. ............... 725/32
2013/0103697 A1* 4/2013 Hill et al. ...................... 707/748
2013/0268189 A1* 10/2013 Kritt et al. ..................... 701/410

OTHER PUBLICATIONS

Jing, Feng et al., "VirtualTour: An Online Travel Assistant Based on High Quality Images," Oct. 23-27, 2006, 4 pages, ACM, Santa Barbara, CA.
Li, Zhen et al., "Learning to Search Efficiently in High Dimensions," 2011, Neural Information Processing Systems, 9 pages.

* cited by examiner

*Primary Examiner* — Pankaj Kumar
*Assistant Examiner* — Charles N Hicks
(74) *Attorney, Agent, or Firm* — Lowenstein Sandler LLP

(57) ABSTRACT

A system and method for associating videos with geographic locations is disclosed. The system comprises a communication module, a location module, a tagging module and a database association module. The communication module receives a video uploaded by a content provider and a set of video data describing the video. The location module determines that the video describes a geographic location included in a geographic map based at least in part on the video data. The tagging module determines one or more travelling tags for the video based at least in part on the video data. The database association module associates the video and the one or more travelling tags with the geographic location so that the video with the one or more travelling tags is included in the geographic map.

15 Claims, 11 Drawing Sheets

ASSOCIATING VIDEO CONTENT WITH GEOGRAPHIC MAPS

BACKGROUND

The specification relates to a data management system. In particular, the specification relates to a system for associating video content with geographic maps.

Increasing numbers of users view content, such as video data, online using one or more video hosting sites. Additionally, many video hosting sites allow users to upload video content to the video hosting site. Users have uploaded and shared numerous videos taken at attractions such as landmarks (e.g., national parks, monuments, etc.) and scenic locations (e.g., mountains, lakes, etc.). Often, users want to view videos of landmarks and scenic locations before going to trips. However, existing methods for discovering such videos are far from efficient. Many users do not possess the technical expertise needed to organize or discover such videos on their own. Existing methods also take too much time so that most users do not attempt to discover such videos.

SUMMARY

In accordance with an embodiment, a system for associating video content with geographic maps includes a content hosting site. The content hosting site manages content such as videos that are accessed by clients. Publishers upload video content to the video hosting site. The content hosting site pushes videos uploaded by publishers to the client. In one embodiment, the client uploads video content.

Specifically, embodiments disclosed herein provide a system and method for associating videos with geographic locations. The system comprises a communication module, a location module, a tagging module and a database association module. The communication module receives a video uploaded by a content provider and a set of video data describing the video. The location module is communicatively coupled to the communication module for determining that the video describes a geographic location included in a geographic map based at least in part on the video data. The tagging module is communicatively coupled to the communication module for determining one or more travelling tags for the video based at least in part on the video data. The database association module is communicatively coupled to the location module and the tagging module for associating the video and the one or more travelling tags with the geographic location so that the video with the one or more travelling tags is included in the geographic map.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

Embodiments are illustrated by way of example, and not by way of limitation in the figures of the accompanying drawings in which like reference numerals are used to refer to similar elements.

DETAILED DESCRIPTION

Figure 1:
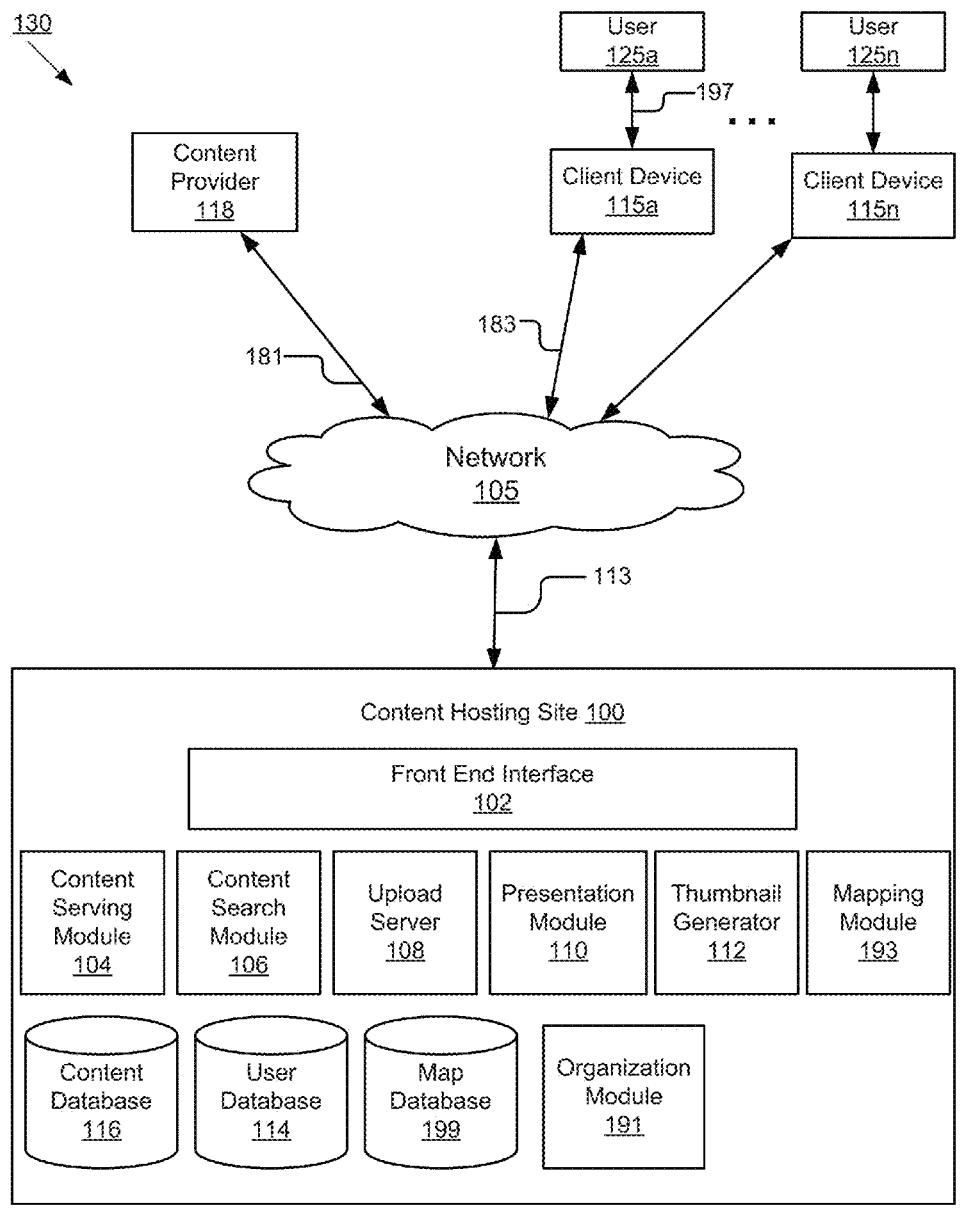
FIG. 1 is a high-level block diagram of system for associating videos with geographic locations in accordance with an embodiment.

A system and method for associating videos with geographic locations is described below. In the following description of the embodiments, for purposes of explanation, numerous specific details are set forth to provide a thorough understanding of the various embodiments. However, it will be apparent to one skilled in the art that the various embodiments can be practiced without these specific details. In other instances, structures and devices are shown in block diagram form in order to avoid obscuring the certain details. For example, an embodiment is described below with reference to user interfaces and particular hardware. However, other embodiments can be described with reference to any type of computing device that can receive data and commands, and any peripheral devices providing services.

Reference to "one embodiment" or "an embodiment" means that a particular feature, structure, or characteristic described in connection with the embodiment is included in at least one embodiment. The appearances of the phrase "in one embodiment" in various places in the description are not necessarily all referring to the same embodiment.

Some portions of the following description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following description, it is appreciated that throughout the description terms such as "processing," "computing," "calculating," "determining," "displaying" or the like, refer to the action and processes of a processor-based computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present embodiments also relate to an apparatus for performing the operations herein. This apparatus may be specially constructed for the required purposes, or it may be a general-purpose computer selectively activated or reconfigured by a computer program stored in the computer. The embodiments disclosed may take the form of an entirely hardware embodiment, an entirely software embodiment or an embodiment including both hardware and software elements. One embodiment is implemented in software comprising instructions or data stored on a computer-readable storage medium, which includes but is not limited to firmware, resident software, microcode or another method for storing instructions for execution by a processor.

Furthermore, the embodiments may take the form of a computer program product accessible from a computer-usable or computer-readable storage medium providing program code for use by, or in connection with, a computer or any instruction execution system. For the purposes of this description, a computer-usable or computer readable storage medium is any apparatus that can contain, store or transport the program for use by or in connection with the instruction execution system, apparatus or device. The computer-readable storage medium can be an electronic, magnetic, optical, electromagnetic, infrared, or semiconductor system (or apparatus or device) or a propagation medium. Examples of a tangible computer-readable storage medium include a semiconductor or solid state memory, magnetic tape, a removable computer diskette, a random access memory (RAM), a read-only memory (ROM), a rigid magnetic disk, an optical disk, an EPROM, an EEPROM, a magnetic card or an optical card. Examples of optical disks include compact disk-read only memory (CD-ROM), compact disk—read/write (CD-R/W) and digital video disc (DVD).

The memory elements may include local memory employed during actual execution of the program code, bulk storage and cache memories providing temporary storage of at least some program code in order to reduce the number of times code must be retrieved from bulk storage during execution. In some embodiments, input/output (I/O) devices (such as keyboards, displays, pointing devices or other devices configured to receive data or to present data) are coupled to the system either directly or through intervening I/O controllers.

Network adapters may also be coupled to the data processing system to allow coupling to other data processing systems or remote printers or storage devices through intervening private or public networks. Modems, cable modem and Ethernet cards are just examples of the currently available types of network adapters.

Finally, the algorithms and displays presented herein are not inherently related to any particular computer or other apparatus. Various general-purpose systems may be used with programs in accordance with the disclosure herein, or it may prove convenient to construct more specialized apparatus to perform the required method steps. The required structure for a variety of these systems will appear from the description below. It will be appreciated that a variety of programming languages may be used to implement the disclosure of the embodiments as described herein.

System Overview

FIG. 1 is a high-level block diagram illustrating an embodiment of a system 130 for associating video content with geographic locations. The illustrated embodiment of the system 130 includes: client devices 115a, 115n (referred to collectively or individually as client devices 115) that are accessed by users 125a, 125n (referred to collectively or individually as users 125), a content provider 118, and a content hosting site 100. The content hosting site 100 includes, among other elements described below, an organization module 191 and a mapping module 193.

Although only one content provider 118, two client devices 115 and one content hosting site 100 are illustrated in FIG. 1, persons having ordinary skill in the art will recognize that any number of content providers 118, client devices 115 and content hosting sites 100 can be communicatively coupled to the network 105. Furthermore, while only one network 105 is coupled to the client devices 115, the content provider 118 and the content hosting site 100, persons having ordinary skill in the art will appreciate that any number of networks 105 can be connected to the client devices 115, the content provider 118 and the content hosting site 100.

The network 105 is a conventional type of network, wired or wireless, and may have any number of configurations such as a star configuration, token ring configuration or other configurations known to those skilled in the art. In one embodiment, the network 105 comprises one or more of a local area network (LAN), a wide area network (WAN) (e.g., the Internet), and/or any other interconnected data path across which multiple devices communicate. In another embodiment, the network 105 is a peer-to-peer network. The network 105 is coupled to or includes portions of a telecommunications network for sending data in a variety of different communication protocols. For example, the network 105 is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 105 are encrypted using conventional encryption technologies such as secure sockets layer (SSL), secure HTTP and/or virtual private networks (VPNs).

In the illustrated embodiment, the content hosting site 100 is communicatively coupled to the network 105 via signal line 113. The content provider 118 is communicatively coupled to the network 105 via signal line 181. The client 115a is communicatively coupled to the network 105 via signal line 183. The user 125a interacts with the client device 115a as represented by signal line 197. Client device 115n and user 125n are coupled and interact in a similar manner.

The content hosting site 100 is any system that allows a user to access intellectual property content via searching and/or browsing interfaces. It will be understood that the term "web site" represents any computer system adapted to serve content using any internet working protocols, and is not intended to be limited to content uploaded or downloaded via the Internet or the HTTP protocol.

In one embodiment, the content hosting site 100 is configured to receive and share all or a portion of any content such as a video or a picture. Persons having ordinary skill in the art will also recognize that the content can be represented in any media type and/or file type. For example, the content hosting site 100 shares content such as one or more of a video file and an image file (such as a JPEG or GIF file).

In one embodiment, sources of contents provided by the content hosting site 100 are from uploads of contents by users 125 operating a client device 115, searches or crawls of other web sites or databases of contents, or the like, or any combination thereof. For example, in one embodiment, a content hosting site 100 is configured to allow uploads of contents by users 125. In another embodiment, the content hosting site 100 is configured to only obtain contents from other sources by crawling such sources or searching such sources in real time.

The content hosting site 100 is communicatively coupled to the network 105. In the illustrated embodiment, the content hosting site 100 includes: a front end interface 102; a content serving module 104; a content search module 106; an upload server 108; a presentation module 110; a thumbnail generator 112; a user database 114; a content database 116; an organization module 191; a mapping module 193; and a map database 199. In one embodiment, the components of the content hosting site 100 are communicatively coupled to one another. For example, they are communicatively coupled to one another via a bus (not pictured). Other conventional features, such as firewalls, load balancers, authentication servers, application servers, failover servers, site management tools, and so forth are not shown so as not to obscure the feature of the system.

In one embodiment, the illustrated components of the content hosting website 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the content hosting site 100 are performed by one or more client devices 115 in other embodiments if appropriate. In one embodiment, the functionality attributed to a particular component is performed by different or multiple components operating together.

In one embodiment, each of the various modules are implemented as a server program executing on a server-class computer comprising one or more central processing units ("CPU," or "CPUs" if plural), memory, network interface, peripheral interfaces, and other well-known components. The computers themselves preferably run an open-source operating system such as LINUX, have generally high performance CPUs, 1 gigabyte or more of memory, and 100 gigabyte or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in tangible computer accessible storage mediums (e.g., random access memory ("RAM"), flash, hard disk, optical/magnetic media, or solid-state drive ("SSD"), etc.).

The front end interface 102 is an interface that handles communication with one or more of the content provider 118 and the client devices 115 via the network 105. For example, the front end interface 102 receives a content file uploaded from the content provider 118 and delivers the content to the upload server 108. In one embodiment, the front end interface 102 receives requests from users 125 of the client devices 115 and delivers the requests to the other components of the content hosting site 100 (e.g., the content search module 106 or the content serving module 104). For example, the content is a video and the front end interface 102 receives a video search query from a user and sends the video search query to the content search module 106.

The upload server 108 receives one or more content files from the content provider 118 via the front end interface 102. For example, the upload server 108 receives one or more of a video file and an image file such as a JPEG or GIF from the content provider 118. In one embodiment, the upload server 108 processes the one or more contents and stores the processed contents in the content database 116. The upload server 108 assigns a content identification ("content ID") to the stored content file. A content ID includes identifiers for videos ("video ID") and pictures ("image ID"). For example, the upload server 108 assigns a video ID to a video and stores the video together with the video ID in the content database 116. In other embodiments, the upload server 108 performs one or more of: formatting a content; compressing a content; metadata tagging a content; content analysis, etc.

The content database 116 is a storage system that stores content shared by the content hosting site 100 with the users 125. In one embodiment, the content database 116 stores the content files processed by the upload server 108. In another embodiment, the content database 116 also stores metadata associated with the content files. The metadata includes one or more of: a title; a description; tag information; a time length; and the like. In one embodiment, some or all of the metadata of the content files is provided by the content provider 118. For example, a user of the content provider 118 provides a title and a description of a content file when uploading the content file to the content hosting site 100.

The content search module 106 includes code and routines that, when executed by a processor (not pictured), processes any search queries received by the front end interface 102 from users 125. A search query received by the front end interface 102 from a user 125 includes search criteria such as keywords that identify content the user is interested in. The content search module 106 uses the search criteria to query the metadata of the content files stored in the content database 116. The search results for the query are returned to the front end interface 102 for presentation to the user 125. For example, if a user 125 provides the front end interface 102 with a keyword search query, the content search module 106 identifies a content file stored in the content database 116 related to the keyword and returns the search result (e.g., content IDs and/or metadata such as titles, descriptions, thumbnails of the identified content files) to the front end interface 102.

The content serving module 104 includes code and routines that, when executed by a processor (not pictured), processes requests for a content (e.g., a video, a book, a picture, a music file, etc) and provides the content to users. For example, the content serving module 104 receives a query from a user via the front end interface 102, retrieves a set of videos from the content database 116 based at least in part on the query and presents the set of videos to the user via the front end interface 102.

In one embodiment, the content serving module 104 receives a request from a user to access a content when the user clicks on a link to the content. The request received from the user includes the content ID of the content that the user wishes to access. In one embodiment, the content ID is included automatically in the request once the user clicks on the link for the content. The content serving module 104 uses the content ID to search and locate the content in the content database 116. Once the requested content is located, the content serving module 104 transmits the content to the user via the front end interface 102. The content is presented to the user on a web page. Metadata associated with the content is also presented with the content, such as the title and description of the content. In one embodiment, the content serving module 104 stores the content ID of the content in the user database 114 after sending the content to the user so that a content history of the user is stored in the user database 114.

The user database 114 is a storage system that stores data and/or information associated with a user. For example, the user database 114 stores the content IDs of content files uploaded by a user to the content hosting site 100 and the content IDs of content files that the user has accessed from the content database 116. In one embodiment, the user is identified by using a login name and password and/or by using the user's internet protocol address.

The thumbnail generator 112 includes code and routines that generates a thumbnail for a content. A thumbnail is a picture that represents a content in the content hosting site 100. For example, assume the content is a video. The thumbnail generator 112 analyzes the video and selects a frame of the video as the thumbnail. In one embodiment, the thumbnail generator 112 provides one or more pictures for the video and the user uploading the video to the content hosting site 100 selects one picture as the thumbnail.

The presentation module 110 includes code and routines that, when executed by a processor (not pictured), presents any information intended for a user to a corresponding client device such as the client device 115. For example, the presentation module 110 generates a graphic associated with the contents stored in the content database 116 or the ownership information stored in the ownership database 128 and sends the graphic to a web browser (not pictured) installed in the client device 115 via the front end interface 102 and the network 105.

The organization module 191 includes code and routines configured to provide the functionality described below with reference to FIGS. 2 and 4. In one embodiment, the organization module 191 associates uploaded videos with geographic locations included in a geographic map.

The mapping module 193 includes code and routines configured to provide the functionality described in further detail below with reference to FIGS. 3 and 5-11. In one embodiment, the mapping module 193 generates a heat map associated with a geographic map. In another embodiment, the mapping module 193 plans a route based at least in part on routing data and determines videos associated with the route. In yet another embodiment, the mapping module 193 determines popularity for a route base on videos associated with the route. In one embodiment, the map database 199 stores the data used by a service such as Google Maps™ and the mapping module 193 is a module configured to use the data stored on the map database 199 to provide the Google Maps™ service.

The content provider 118 is any device that provides contents to the content hosting site 100. For example, the content provider 118 is a computing device that uploads a content to the content hosting site 100. The content provider 118 is communicatively coupled to the network 105. In one embodiment, the content provider 118 is also a client device 115. In one embodiment, the content provider 118 is the same entity that operates the content hosting site 100.

In one embodiment, the content provider 118 is configured to operate a client device to perform various content provider functions. Examples of the content provider functions include, but are not limited to: uploading a content to the content hosting site 100; editing a content stored by the content hosting site 100; removing a content from the content hosting site 100; and editing content provider preferences associated with a content.

In one embodiment, the content provider 118 is configured to provide map data to the organization module 191 and the mapping module 193 included in the content hosting site 100. For example, the map data includes data describing a geographic map.

The client devices 115 are any processor-based computing devices. The client device 115 executes client software such as a web browser or built-in client application and connects to the content hosting site 100 via the network 105. In one embodiment, the client device 115 includes a variety of different computing devices. Examples of a client device 115 include, but are not limited to: a personal computer; a personal digital assistant; a television set-up box; a tablet computer; a smart phone; and a laptop computer. The client device 115 comprises a processor (not pictured), a memory (not pictured) and other components conventional to a computing device. In one embodiment, the client device 115 is communicatively coupled to the network 105.

In one embodiment, the client device 115 is configured to retrieve contents stored by the content hosting site 100. For example, the client device 115 includes an embedded video player (e.g., the Flash™ player from Adobe System, Inc.) adapted for the video content formats used in the content hosting site 100 so that a user is able to view a video from the content hosting site 100 using the embedded video player. In one embodiment, the client device 115 is configured to be a content provider 118 for providing contents to the content hosting site 100.

Organization Module 191

Figure 2:
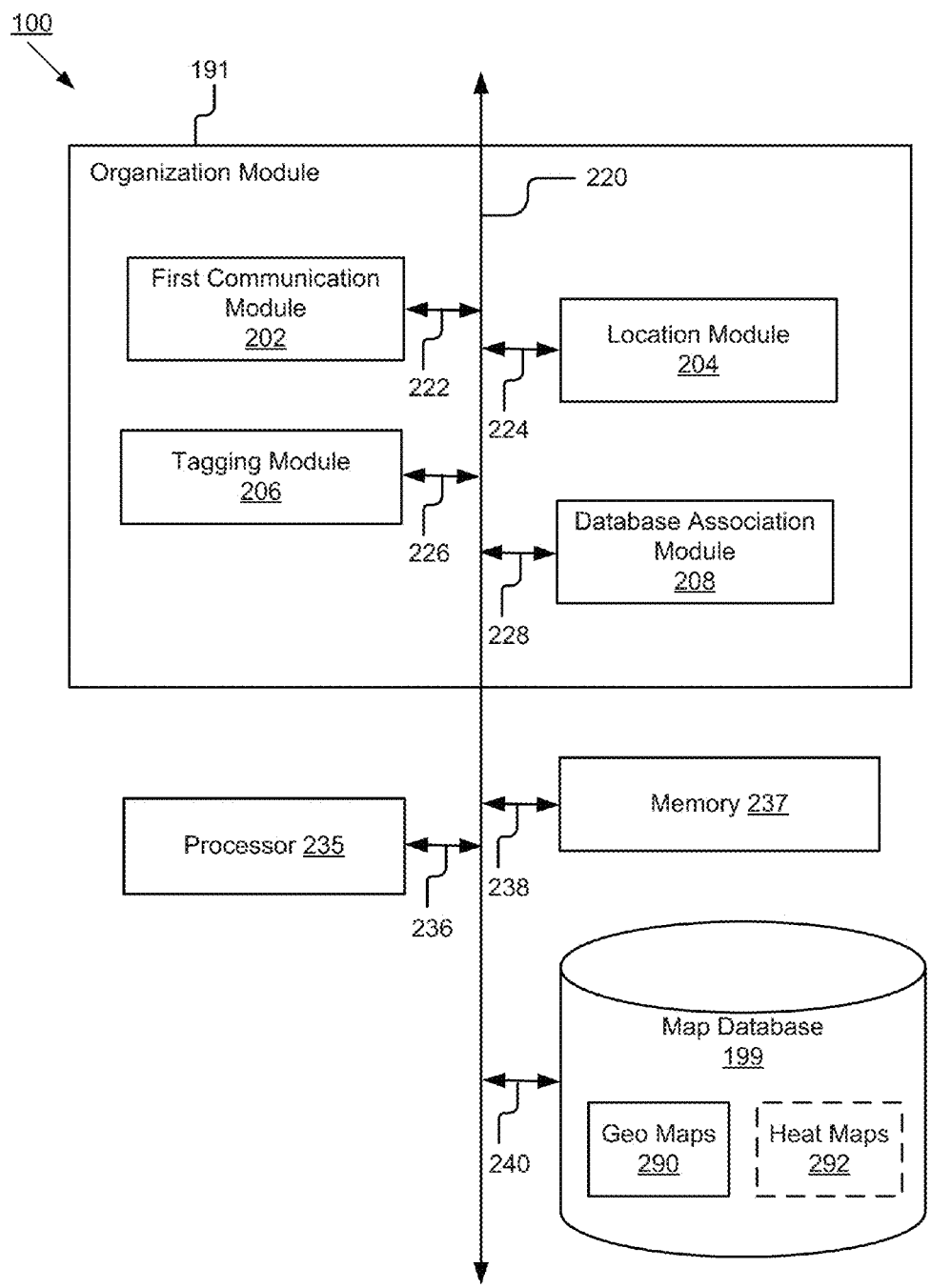
FIG. 2 is a block diagram of an organization module in accordance with an embodiment.

Referring now to FIG. 2, the organization module 191 is shown in more detail. FIG. 2 is a block diagram depicting an embodiment of the content hosting site 100. Depicted in FIG. 2 are the organization module 191, a processor 235, a memory 237 and the map database 199. In one embodiment, the components of the content hosting site 100 not depicted in FIG. 2 (e.g., the content serving module 104, content search module 106, upload server 108, thumbnail generator 112, etc.) are stored in the memory 237.

In one embodiment, the processor 235 is a computer processor of the content hosting site 100, and can be used to execute code and routines that comprise one or more of the content serving module 104, content search module 106, upload server 108, thumbnail generator 112, and the organization module 191. The processor 235 comprises an arithmetic logic unit, a microprocessor, a general purpose controller or some other processor array to perform computations and execute the content serving module 104, content search module 106, upload server 108, thumbnail generator 112 and the organization module 191. The processor 235 is coupled to the bus 220 for communication with the other components of the content hosting site 100. In one embodiment, the processor 235 is used to execute one or more of the first communication module 202, the location module 204, the tagging module 206 and the database association module 208.

The processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible. The processor 235 is communicatively coupled to the bus 220 via signal line 236.

The memory 237 is a non-transitory storage medium. The memory 237 stores instructions and/or data that may be executed by the processor 235. For example, the memory 237 stores one or more of the modules of the content hosting site 100 described above with reference to FIG. 1. The memory 237 is communicatively coupled to the bus 220 for communication with the other components of the content hosting site 100. In one embodiment, the instructions and/or data stored on the memory 237 comprises code for performing any and/or all of the techniques described herein. The memory 237 is a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other non-volatile storage device known in the art. The memory 237 is communicatively coupled to the bus 220 via signal line 238. In one embodiment, the memory 237 stores the organization module 191 and the sub-modules 202, 204, 206, 208 that are included in the organization module 191.

The map database 199 is communicatively coupled to the bus 220 via signal line 240. The map database 199 includes geographic maps 290 ("geo maps") that will be described below with reference to database association module 208. In one embodiment, the map database 199 also includes heat maps 292 that will be described below with reference to FIG. 3. The heat maps data 292 are depicted using a dashed line to indicate that it is an optional element in map database 199.

In one embodiment, the organization module 191 comprises a first communication module 202, a location module 204, a tagging module 206 and a database association module 208.

The first communication module 202 includes code and routines that, when executed by processor 235, manages communications among the elements of the organization module 191 and the content hosting site 100. The first communication module 202 is communicatively coupled to the bus 220 via signal line 222.

In one embodiment, the first communication module 202 receives a video uploaded by a content provider 118. For example, the upload server 108 receives a video from a content provider 118 and delivers the video to the first communication module 202. In one embodiment, the first communication module 202 also receives a set of video data describing the video. In one embodiment, the set of video data is uploaded by the content provider 118. In another embodiment, the set of video data includes data automatically generated by other elements of the content hosting site 100. Examples of the set of video data include, but not limited to, video metadata, a geographic tag, an Internet Protocol (IP) address, an automatic tag, a content provider tag and video content. An automatic tag is a tag describing content stored on the asset database 116 and generated by the tagging module 206. In one embodiment the automatic tag is referred to as a "travelling tag." A content provider tag is a tag describing content stored on the content database 116 and provided to the content hosting site 100 by the content provider 118. For example, the content provider 118 uploads a video to the asset hosting site 100. The presentation module 110 provides a GUI to the content provider 118. The GUI includes functionality to enable the content provider 118 to provide input describing the video. The input is stored on the content hosting site 100 as a content provider tag. In one embodiment, the first communication module 202 sends the received video and the set of video data to the location module 204 and/or the tagging module 206.

The location module 204 includes code and routines that, when executed by the processor 235, determines location data for an uploaded video file. For example, the location module 204 determines that an uploaded video describes a geographic location (e.g., Paris) included in a geographic map. In one embodiment, the location module 204 analyzes the uploaded video content as well as other video data describing the uploaded video to determine a geographic location associated with the video. For example, the location module 204 determines that the video was shot at a geographic location (e.g., Yellowstone Park) based at least in part on the video content and the other video data. For example, the other video data, as described above, includes video metadata, a geographic tag, an Internet Protocol (IP) address, an automatic tag and a content provider tag. Assume for example, that the video content is a video of the Old Faithful geyser erupting. Further assume that the video data includes a geographic tag that is the geographic coordinates of the location of the Old Faithful geyser and a content provider tag indicating that the video content is related to "Old Faithful" and "Yellowstone Park." The location module 204 determines location data for the video content based at least in part on the geographic tag and the content provider tag.

In one embodiment, a video is captured using a processor based device (e.g., a smart phone, a tablet computer, a laptop, etc.) that is associated with a geographic location service such as Google Latitude™, and the geographic location service communicates with the processor based device to tag the video. For example, the processor based device is a smart phone and the smart phone records a video at Yellowstone Park. The human user of the smart phone that has opted in to Google Latitude™. The smart phone is enabled with a geographic positioning system chip ("a GPS chip"). The Google Latitude™ service communicates with the smart phone to tag the video to indicate that the video was taken at Yellowstone Park. The user is associated with the content provider 118. In one embodiment, the content provider 118 is the smart phone used to capture the video. The content provider 118 uploads the video to the content hosting site 100. The video includes the tag provided by the Google Latitude™ service. This tag is an example of a content provider tag. Accordingly, in one embodiment the content provider tag is a tag that is embedded in the content uploaded to the content hosting site 100.

In one embodiment, the video is captured by a GPS enabled processor based device and the processor based device stores and executes an application that tags the video with a content provider tag that describes the geographic location where the video was captured.

In one embodiment, the location module 204 applies machine learning techniques to train multi-class classifiers using video content and other video data. For example, the multi-class classifiers are trained to distinguish geographic locations at varying levels of resolution (e.g., city, sub-administrative area, administrative area, country, etc.). The location module 204 assigns a confidence score (e.g., between 0 and 1, between 0 and 10, between −10 and 10, etc.) to the uploaded video for each candidate geographic location and then chooses the highest scoring location. In one embodiment, the location module 204 applies a geographic-relevance classifier to the uploaded video to establish how geographically relevant the uploaded video is. The location module 204 detects landmarks in the uploaded video if the uploaded video is geographically relevant. In one embodiment, a geographically relevant video has a confidence score above a certain threshold defined by a human administrator of the content hosting site 100. For example, the confidence score is measured on a scale of 0 to 10 with 10 being the highest confidence, and the video is highly geographically relevant if the confidence score is equal to or higher than 6. In one embodiment, the location module 204 applies a geographic-relevance ranker to the uploaded video to establish how geographically relevant the uploaded video is. A geographic-relevance ranker is a machine learning system that ranks a set of objects by a geographic relevance criteria after it is trained by the system 100 or an administrator of the system 100. Persons having ordinary skill in the art of machine learning systems will be familiar with rankers and how they are trained.

In one embodiment, the location module 204 sends the determined geographic location associated with the uploaded video to the database association module 208. The location module 204 is communicatively coupled to the bus 220 via signal line 224.

The tagging module 206 includes code and routines that, when executed by the processor 235, determines one or more travelling tags for the uploaded video file. A travelling tag specifies a type of attraction associated with the uploaded video file. Examples of a travelling tag include, but not limited to, a lake, mountain, landmark, river, beach, sea, canyon, etc. Assume that an uploaded video records a trip around a lake. The tagging module 206 determines that the uploaded video is associated with a travelling tag "lake" based at least in part on the content of the video and other video data describing the video. In one embodiment, the tagging module 206 adds the determined travelling tag to the video data associated with the uploaded video.

In one embodiment, the tagging module 206 applies machine learning techniques to train multi-class classifiers using video content and other video data. The tagging module 206 uses the multi-class classifiers to determine one or more travelling tags for the uploaded video based at least in part on an analysis of the video content and/or other video data describing the uploaded video such as video metadata and content provider tags. In one embodiment, the tagging module 206 sends the travelling tag for the uploaded video to the database association module 208. The tagging module 206 is communicatively coupled to the bus 220 via signal line 226.

In one embodiment, tagging module 206 includes code and routines that, when executed by the processor 235, performs a fingerprint analysis of one or more videos. The content database 116 stores one or more traveling fingerprints for videos that are known to have certain geographic features. For example, a first video of a lake is uploaded to the content hosting site 100 by an administrator of the content hosting site 100. The administrator knows that the video includes footage of a lake. The tagging module 206 performs a fingerprint analysis of the first video to determine a first fingerprint associated with the first video. The first fingerprint is stored on the content database 116 as an example of a video that should be tagged as including lake footage. Since the first fingerprint is known to be associated with a lake, the tagging module 206 can compare other fingerprints to the first fingerprint to determine whether these other fingerprints include footage of a lake. A second video is uploaded to the content hosting site 100 by a content provider 118. The tagging module 206 performs a fingerprint analysis of the second video to determine a second fingerprint associated with the second video. The second video is compared to a set of known fingerprint stored on the content database 116. The tagging module 206 determines that the second fingerprint approximately matches the first fingerprint, and so, the tagging module 206 determines that the second video includes footage of a lake. Accordingly, the tagging module 206 tags the second video with a travelling tag describing the second video as including a lake scene. Persons having skill in the art will appreciate how the tagging module 206 recognizes portions of scenes in a video to determine the features of that scene.

The database association module 208 includes code and routines that, when executed by the processor 235, associates an uploaded video and one or more tags (e.g., traveling tags or content provider tags) for the video with one or more geographic locations in the map database 199. In one embodiment, the database association module 208 receives location data associated with an uploaded video determined by the location module 204. For example, the location data describes a geographic location where the uploaded video was shot. The database association module 208 determines one or more geographic locations included in the geo maps 290 stored on the map database 199 that match or approximately match the geographic location where the uploaded video was shot. In one embodiment, the administrator of the content hosting site 100 provides an input to the content hosting site 100 that specifies how close two geographic locations must be for them to be determined to be an approximate match by the database association module 208. For example, the administrator specifies a parameter having a 2 mile diameter with the first location located in the center of the parameter, and, the second location approximately matches the first location if the second location is within the parameter defined by the administrator. The database association module 208 associates the uploaded video with the one or more geographic locations included in the geo maps 290. In one embodiment, the database association module 208 also receives one or more travelling tags for the uploaded video determined by the tagging module 206. For example, the database association module 208 associates the uploaded video and the one or more travelling tags with the one or more geographic locations included in the geo maps 290.

In one embodiment, the database association module 208 stores an identifier ("ID") of the uploaded video and the one or more travelling tags for the video in the map database 199 associated with the one or more geographic locations included in the geo maps 290. For example, the database association module 208 organizes the uploaded videos and the one or more travelling tags for the uploaded videos based at least in part on the one or more geographic locations stored in the geo maps 290 so that the uploaded videos and their tags are associated with one or more geographic maps. In another example, the database association module 208 groups the uploaded videos by their associated geographic locations and then lists the geographic locations in a tree-like data structure (e.g., a directory structure). In this way, when a user 125 operating a client device 115 requests videos describing a geographic location, the content hosting site 100 provides the videos to the user quickly by querying the geo maps 290 in the map database 199. The database association module 208 is communicatively coupled to the bus 220 via signal line 228.

The geo maps data 290 is data stored on the map database 199. In one embodiment, the geo maps data 290 is provided by the content provider 118. In another embodiment, the geo maps data 290 is generated by the content hosting site 100. The geo maps data 290 includes data describing geographic maps that include geographic locations. For example, the geo maps data 290 is the data used by a service such as Google Maps™ and the mapping module 193 is a module configured to use the geo maps data 290 to provide the Google Maps™ service. In one embodiment, the geo maps data 290 also includes data describing videos and their travelling tags associated with the geographic maps as described above. In one embodiment, the geo maps data 290 includes any other data necessary for the organization module 191 and/or the mapping module 193 to provide their functionalities.

In one embodiment, the organization module 191 is stored in a non-transitory memory of the client device 115. In one embodiment, the organization module 191 is a component of a browser application (e.g., Google Chrome™, Mozilla Firefox™, etc.) or a media player application (e.g., a java media player) stored in a non-transitory memory of the client device 115. In one embodiment, the organization module 191 is stored in a non-transitory memory of the content provider 118. In one embodiment, the organization module 191 is stored in a non-transitory memory associated with the hosting site 100 and executed by a processor of the hosting site 100.
Mapping Module 193

Figure 3:
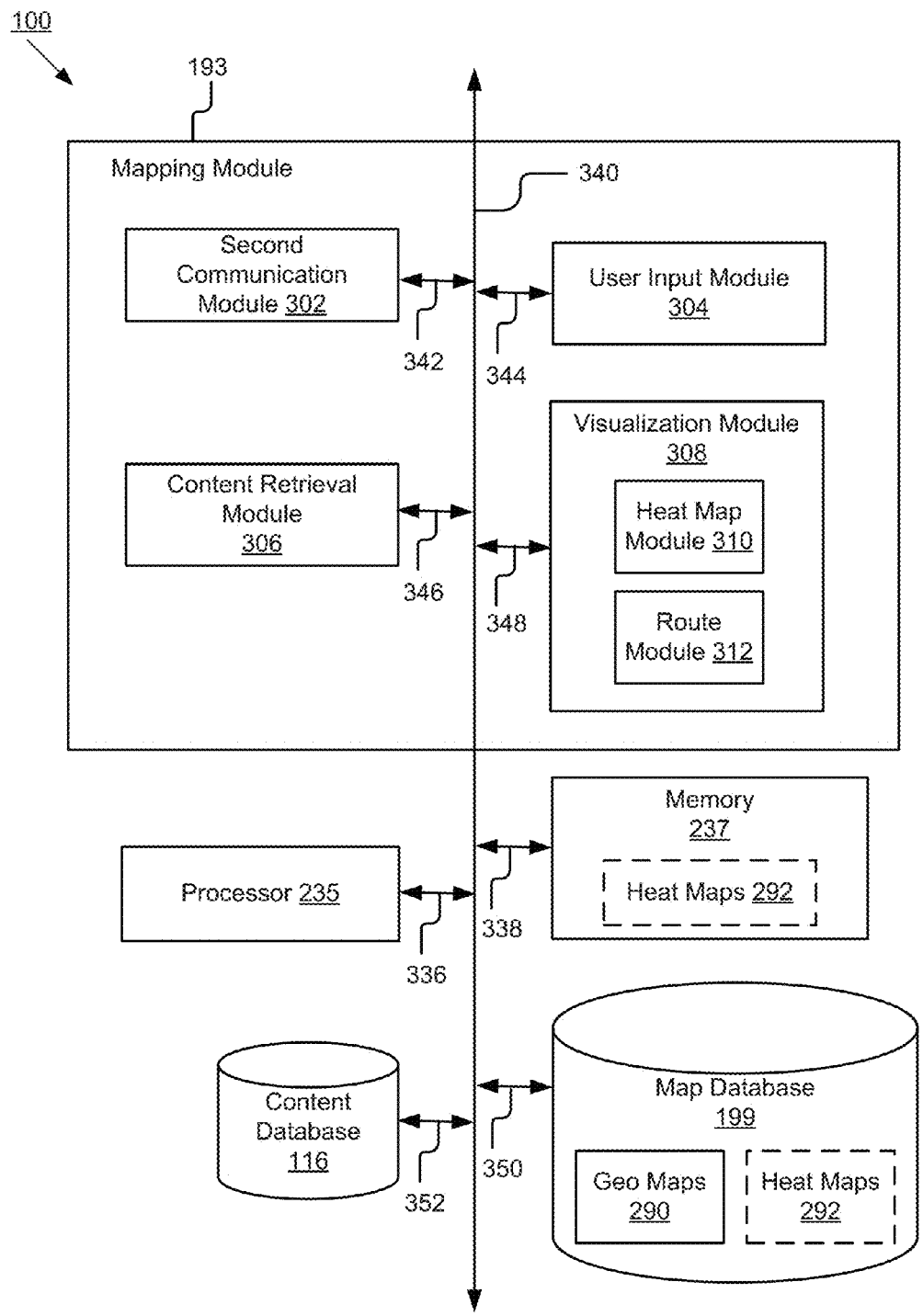
FIG. 3 is a block diagram of a mapping module in accordance with an embodiment.

Referring now to FIG. 3, the mapping module 193 is shown in more detail. FIG. 3 is a block diagram depicting an embodiment of the content hosting site 100. Depicted in FIG. 3 are the mapping module 193, the processor 235, the memory 237, the map database 199 and the content database 116 that are communicatively coupled to a bus 340. In one embodiment, the bus 340 is the same as bus 220 as shown in FIG. 2. In another embodiment, the bus 340 is another bus included in the content hosting site 100 to facilitate communications between the mapping module 193 and other components in the content hosting site 100. In one embodiment, the components of the content hosting site 100 not depicted in FIG. 3 (e.g., the content serving module 104, the content search module 106, the upload server 108, the thumbnail generator 112, etc.) are stored in the memory 237.

The processor 235 has the same functionality as described above with reference to FIG. 2, and so the descriptions of its functionality will not be repeated herein. In one embodiment, the processor 235 is the same processor described above with reference to FIG. 2. In another embodiment, the content hosting site 100 includes one or more second processors that can be used to execute code and routines that comprise the mapping module 193. The processor 235 is coupled to the bus 340 for communication with the other components of the content hosting site 100 via signal line 336.

The memory 237 has the same functionality as described above with reference to FIG. 2, and so the descriptions of its functionality will not be repeated herein. In one embodiment, the memory 237 is the same as the memory shown in FIG. 2. The memory 237 stores instructions and/or data that may be executed by the processor 235. The memory 237 is communicatively coupled to the bus 340 for communication with the other components of the content hosting site 100 via signal line 338. In one embodiment, the memory 237 stores the mapping module 193 and the sub-modules 302, 304, 306, 308, 310, 312. In another embodiment, the content hosting site 100 includes a second memory that stores instructions and/or data that may be executed by the processor 235. In one embodiment, the second memory stores the mapping module 193 and/or other components of the content hosting site 100.

In one embodiment, the memory 237 includes the heat maps data 292. The heat maps data 292 is depicted in the memory 237 by a rectangle formed by a dashed line to indicate that the heat maps data 292 is an optional element of the memory 237. In one embodiment, the heat maps data 292 is stored in the map database 199 and is depicted in the map database 199 by a rectangle formed by a dashed line to indicate that the heat maps data 292 is an optional element of the map database 199. The heat maps data 292 will be described in further detail below with reference to heat map module 310.

The map database 199 is communicatively coupled to the bus 340 via signal line 350. The map database 199 includes geo maps data 290 that has been described above with reference to FIG. 2. In one embodiment, the map database 199 also includes heat maps data 292. The heat maps data 292 is the data necessary for the heat map module 310 to perform its function. The heat maps data 292 are described in more detail below with reference to the heat map module 310.

The content database 116 is described above with reference to FIG. 1, and so, that description will not be repeated here. The content database 116 is communicatively coupled to the bus 340 via signal line 352.

In one embodiment, the mapping module 193 comprises a second communication module 302, a user input module 304, a content retrieval module 306 and a visualization module 308 including a heat map module 310 and a route module 312.

The second communication module 302 includes code and routines that, when executed by processor 235, manages communications among the elements of the mapping module 193 and the content hosting site 100. The second communication module 302 is communicatively coupled to the bus 340 via signal line 342.

In one embodiment, the second communication module 302 receives a search query from a user 125 operating a client device 115. For example, responsive to a user 125 inputting a search query to a user interface displayed on a client device 115 that indicates a geographic location included in a geographic map, the second communication module 302 receives the search query from the client device 115 via the network 105 and the front end interface 102. In one embodiment, the second communication module 302 delivers the search query to the user input module 304.

The user input module 304 includes code and routines that, when executed by the processor 235, receives a search query from the second communication module 302 and parses the search query. In one embodiment, the user input module 304 receives a search query indicating a geographic location included in a geographic map. The user input module 304 parses the search query to obtain data describing the geographic location. For example, the user input module 304 receives a search query from a user 125 that states "attractions in Mountain View, Calif." The user input module 304 parses the search query and determines that the user wants to know attractions around Mountain View, Calif. In another embodiment, a search query includes routing data that describes a starting point and a destination of a trip. For example, a user 125 searches for "beautiful scenes on the trip from San Francisco to Los Angeles." The user input module 304 determines routing data that describes the starting point (e.g., San Francisco) and the destination (e.g., Los Angeles) for the trip by parsing the search query. In yet another embodiment, a search query also specifies an attraction type that matches or corresponds to a travelling tag. For example, a search query states "a route from Los Angeles to San Diego that is close to lake scenes." The user input module 304 determines that the user wants to see lakes on the trip from Los Angeles to San Diego. The user input module 304 then determines tag data (e.g., lake) as well as routing data describing a starting point (e.g., Los Angeles) and a destination (e.g., San Diego).

In one embodiment, the user input module 304 receives a user selection describing a user selected travelling tag. For example, a user 125 inputting a search query that states "attractions in Mountain View, Calif.," the user 125 clicks on one of the travelling tag buttons (e.g., museum) in a user interface displayed on a client device 115. The user input module 304 then receives data describing the user selected tag (e.g., data indicating that the user wants to see museums such as the Computer History Museum located in Mountain View, Calif.).

In one embodiment, the user input module 304 sends parsing results for search queries and/or user selections to the content retrieval module 306. In the example of the search query stating "attractions in Mountain View, Calif.," the user input module 304 sends data describing the geographic location in a geographic map (e.g., a geographic map of Mountain View, Calif.) to the content retrieval module 306 for retrieving videos associated with the geographic location.

In another embodiment, the user input module 304 sends routing data describing a starting point and a destination to the route module 312. In the example of the user 125 searching for "beautiful scenes on the trip from San Francisco to Los Angeles," the user input module 304 sends routing data describing the starting point (e.g., San Francisco) and the destination (e.g., Los Angeles) to the route module 312 for determining one or more routes between San Francisco and Los Angeles.

In one embodiment, if the user input module 304 also receives a user selection for a travelling tag associated with a search query or the user input module 304 obtains data describing a travelling tag from a search query besides data describing geographic locations, the user input module 304 sends data describing the travelling tag as well as data describing geographic locations to the content retrieval module 306.

The user input module 304 is communicatively coupled to the bus 340 via signal line 344.

The content retrieval module 306 includes code and routines that, when executed by the processor 235, retrieves one or more videos and/or data describing videos from the content database 116 and/or the map database 199 based at least in part on parsed user inputs by the user input module 304. In one embodiment, the content retrieval module 306 receives a parsing result for a search query from the user input module 304. For example, the content retrieval module 306 receives data describing a geographic location (e.g., Mountain View, Calif.) in a geographic map specified by a search query. The content retrieval module 306 determines one or more videos associated with the geographic location based at least in part on the data stored in the map database 199. For example, the content retrieval module 306 queries the geo maps 290 in the map database 199 for one or more video IDs associated with the geographic location. In one embodiment, the content retrieval module 306 also retrieves video IDs associated with other geographic locations in the geographic map. For example, the other geographic locations in the map are in a range (e.g., 100 miles) of the geographic location specified by the search query. In one embodiment, the content retrieval module 306 also retrieves the one or more videos and video metadata from the content database 116 based at least in part on the videos IDs. In another embodiment, the content retrieval module 306 retrieves social data associated with the one or more videos from the content database 116 and/or from other resources via the network 105. In one embodiment, the content retrieval module 306 sends the retrieved videos, video metadata and/or social data to the heat map module 310.

In one embodiment, the content retrieval module 306 receives data describing a travelling tag as well as data describing a geographic location in a map from the user input module 304. The content retrieval module 306 determines one or more videos associated with the travelling tag and associated with the geographic location based at least in part on data in the map database 199. For example, a user 125 operating a client device 115 searches for "attractions in Mountain View, Calif." and also clicks on a travelling tag button of "museum" in a user interface. The content retrieval module 306 receives data describing the travelling tag "museum" as well as data describing Mountain View, Calif. The content retrieval module 306 then queries the geo maps 290 in the map database 199 for video IDs tagged as "museum" and associated with the geographic location "Mountain View, Calif." For example, the content retrieval module 306 retrieves a geographic map of Mountain View, Calif. and one or more videos recorded at the Computer History Museum located in Mountain View, Calif.

In one embodiment, the content retrieval module 306 receives route data describing a route from the route module 312. The route has one or more geographic locations associated with it. For example, the one or more geographic locations are included along the route. In another example, the one or more geographic locations are close to the route (e.g., in a range of 50 miles to the route). The route module 312 and route data describing a route will be described in further detail below. In one embodiment, the content retrieval module 306 determines videos associated with the one or more geographic locations included in or close to the route. For example, the content retrieval module 306 queries the geo maps 290 in the map database 199 for video IDs associated with the one or more geographic locations included in or close to the route.

In one embodiment, if a user 125 also specifies a travelling tag associated with the route query, the content retrieval module 306 receives data describing the travelling tag as well as the one or more geographic locations included in or close to the route and determines videos based at least in part on the travelling tag as well as the one or more geographic locations. In the example where a user 125 searches for "a route from Los Angeles to San Diego that is close to lake scenes," the content retrieval module 306 receives data describing the travelling tag "lake" from the user input module 304 as well as receives data describing a route starting from "Los Angeles" and ending at "San Diego" from the route module 312. Assume that the route includes a few intermediate locations (e.g., Santa Ana, Irvine, etc.) between the starting point "Los Angeles" and the destination "San Diego." The route data, in this example, also describes the intermediate locations. In some examples, the route data also describes a few geographic locations close to the route (e.g., Long Beach, Limestone Park, etc.). The content retrieval module 306 queries the geo maps 290 in the map database 199 for videos tagged with "lake" that are associated with the route. For example, the videos associated with the route include videos associated with the starting point (e.g., Los Angeles), the destination (e.g., San Diego) and the intermediate locations (e.g., Santa Ana, Irvine, etc.). In another example, the videos associated with the route also include videos associated with geographic locations close to the route (e.g., Long Beach, Limestone Park, etc.).

In one embodiment, the content retrieval module 306 sends retrieved videos and/or video metadata to the presentation module 110 for generating a user interface displaying the videos and video metadata or indications for the videos in a geographic map. The content retrieval module 306 is communicatively coupled to the bus 340 via signal line 346.

The visualization module 308 includes the heat map module 310 and the route module 312. The visualization module 308 is communicatively coupled to the bus 340 via signal line 348.

The heat map module 310 includes code and routines that, when executed by the processor 235, generates heat maps for geographic maps and determines popularities for routes based at least in part on videos, video metadata and/or social data for videos retrieved by the content retrieval module 306. In one embodiment, the heat map module 310 determines a density of videos for a geographic location in a geographic map. The heat map module 310 calculates the density based at least in part on a number of videos associated with the geographic location retrieved by the content retrieval module 306. In one embodiment, a density of videos for a geographic location describes a relative number of videos associated with the geographic location. For example, a density of videos for a geographic location specifies a percentage of videos associated with the geographic location relative to a the total number of videos stored on the content database 116 or a subset of the total videos stored on the content database 116. In another example, the density of videos for Mountain View, Calif. describes a scaled total number of videos taken in the area of Mountain View, Calif. Assume that the density of videos is scaled to a range between 0-1. An example of the density of videos associated with Mountain View, Calif. is 0.65.

In one embodiment, the heat map module 310 determines a density of specifically tagged videos for a geographic location. For example, the geographic location is Utah and the heat map module 310 determines a total number of videos having a "canyon" tag for Utah area as 500. The heat map module 310 determines the density of "canyon" videos for Utah by comparing the total number of videos with a standard number (e.g., 400). The heat map module 310 then scales the total number of "canyon" videos to a range such as 0-1.

In one embodiment, the heat map module 310 also determines densities of videos associated with other geographic locations in the geographic map that includes the geographic location indicated by the search query. The heat map module 310 receives videos and video metadata associated with geographic locations in a geographic map from the content retrieval module 306 and calculates densities of videos for these geographic locations.

In one embodiment, the heat map module 310 determines a heat map for a geographic map using densities of videos for geographic locations included in the geographic map. In one embodiment, a heat map describes densities of videos for geographic locations in the geographic map. For example, a heat map for a geographic map around Salt Lake City, Utah area describes densities of videos taken at variety of locations around Salt Lake City area, e.g., including Salt Lake City, Great Salt Lake, Salt Lake City Airport, Park City, Utah Lake, Provo, etc. In one embodiment, the heat map module 310 generates a heat map based at least in part on videos with one or more travelling tags. For example, a heat map for traveling tag "lake" for Salt Lake City area includes densities determined based at least in part on only videos with travelling tag "lake," e.g., videos taken at Great Salt Lake and Utah Lake.

In one embodiment, the heat map module 310 stores heat maps 292 in the map database 199. In another embodiment, the heat maps 292 are generated in run time and temporally buffered in the memory 237. In one embodiment, the heat map module 310 sends the heat maps 292 to the presentation module 110 for determining graphical data to display the heat maps 292 in a user interface on a client device 115.

The heat maps data 292 is data describing one or more heat maps for one or more geographic maps. In one embodiment, the heat maps data 292 describes heat maps for travelling tags.

In one embodiment, the heat maps data 292 includes any other data necessary for the mapping module 193 to provide its functionalities.

In one embodiment, the heat map module 310 determines popularities for routes based at least in part on videos associated with the routes and social data associated with the videos. For example, videos associated with routes include videos taken at geographic locations included in the routes. In another example, videos associated with routes also include videos taken at geographic locations close to the routes. In one embodiment, the heat map module 310 receives videos associated with a route and social data describing the videos from the content retrieval module 306. Examples of social data associated with videos include, but not limited to, a total number of the videos, a number of views for the videos, a number of approval indications for the videos (e.g., a "like" indication), a number of disapproval indications for the videos (e.g., a "dislike" indication) and a number of comments for the videos. In one embodiment, the heat map module 310 determines popularity for the route based at least in part on the social data describing the videos. For example, popularity for the route is a score of 4 out of 5 stars indicating how popular the route is.

In one embodiment, the heat map module 310 determines popularities for a set of candidate routes and sends data describing the popularities for candidate routes to the presentation module 110. The presentation module 110 generates a user interface displaying the set of candidate routes and their corresponding popularities on a client device 115 so that a user 125 may choose one of the candidate routes using their popularities as one of the decision factors.

The route module 312 includes code and routines that, when executed by the processor 235, plans routes based at least in part on parsed search queries by user input module 304. In one embodiment, the route module 312 receives a parsing result for a search query from the user input module 304. The parsing result includes routing data that specifies a starting point and a destination. The route module 312 determines one or more routes between the starting point and the destination. In one embodiment, the route module 312 generates route data describing the one or more routes. The routes each includes one or more geographic locations along the routes and one or more geographic locations close to the routes. For example, route data for a route between Los Angeles to San Diego describes locations on the route (e.g., Santa Ana, Irvine, etc.) and locations close to the route (e.g., Long beach, Limestone Park, etc.). In some examples, the route data also describes other information such as road information, total miles along the route, driving time, etc.

In one embodiment, the route module 312 sends the route data describing the routes to the content retrieval module 306 for retrieving videos associated with the routes. In another embodiment, the route module 312 stores route data (not pictured) in the map database 199.

In one embodiment, the mapping module 193 is stored in a non-transitory memory of the client device 115. In one embodiment, the content enhancer is a component of a browser application (e.g., Google Chrome™, Mozilla Firefox™, etc.) or a media player application (e.g., a java media player) stored in a non-transitory memory of the client device 115. In one embodiment, the mapping module 193 is stored in a non-transitory memory of the content provider 118.

Methods

FIGS. 4-7 depict various methods 400-700 performed by the system described above with reference to FIGS. 1-3.

Figure 4:
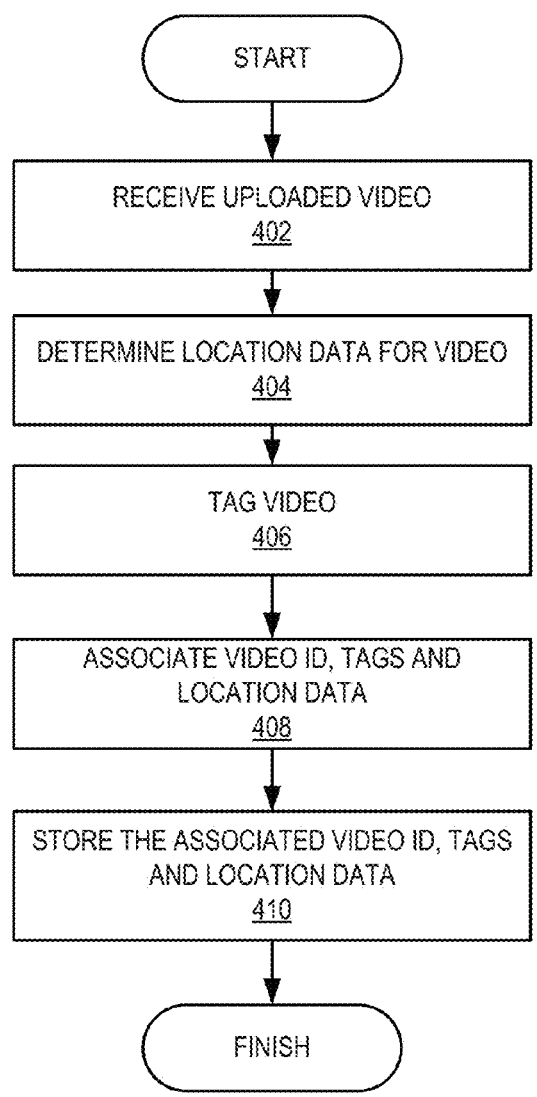
FIG. 4 is a flow diagram of a method for associating videos with locations in accordance with an embodiment.

FIG. 4 is a flow diagram depicting one embodiment of a method 400 implemented by the organization module 191 for associating videos with geographic locations. In one embodiment, the organization module 191 begins the method 400 responsive to a user 125 of a client device 115 or a content provider 118 uploading a video to the content hosting site 100. At step 402, the content hosting site 100 receives the uploaded video via the network 105. In one embodiment, a set of video data for the uploaded video is also received. In another embodiment, the content hosting site 100 generates a portion of video data for the uploaded video. At step 404, the location module 204 determines location data for the uploaded video based at least in part on the set of video data and video content. For example, the location module 204 determines that the uploaded video describes a geographic location included in a geographic map.

At step 406, the tagging module 206 determines one or more travelling tags for the uploaded video based at least in part on the video data. For example, the travelling tags include one or more of a lake, mountain, landmark, river, beach, sea and canyon. At step 408, the database association module 208 associates the video, the one or more travelling tags and the location data. In one embodiment, the database association module 208 associates an ID of the video and the one or more travelling tags for the video with the geographic location. At step 410, the database association module 208 stores the associated video ID, the one or more tags and the location data in the geo maps 290.

Figure 5:
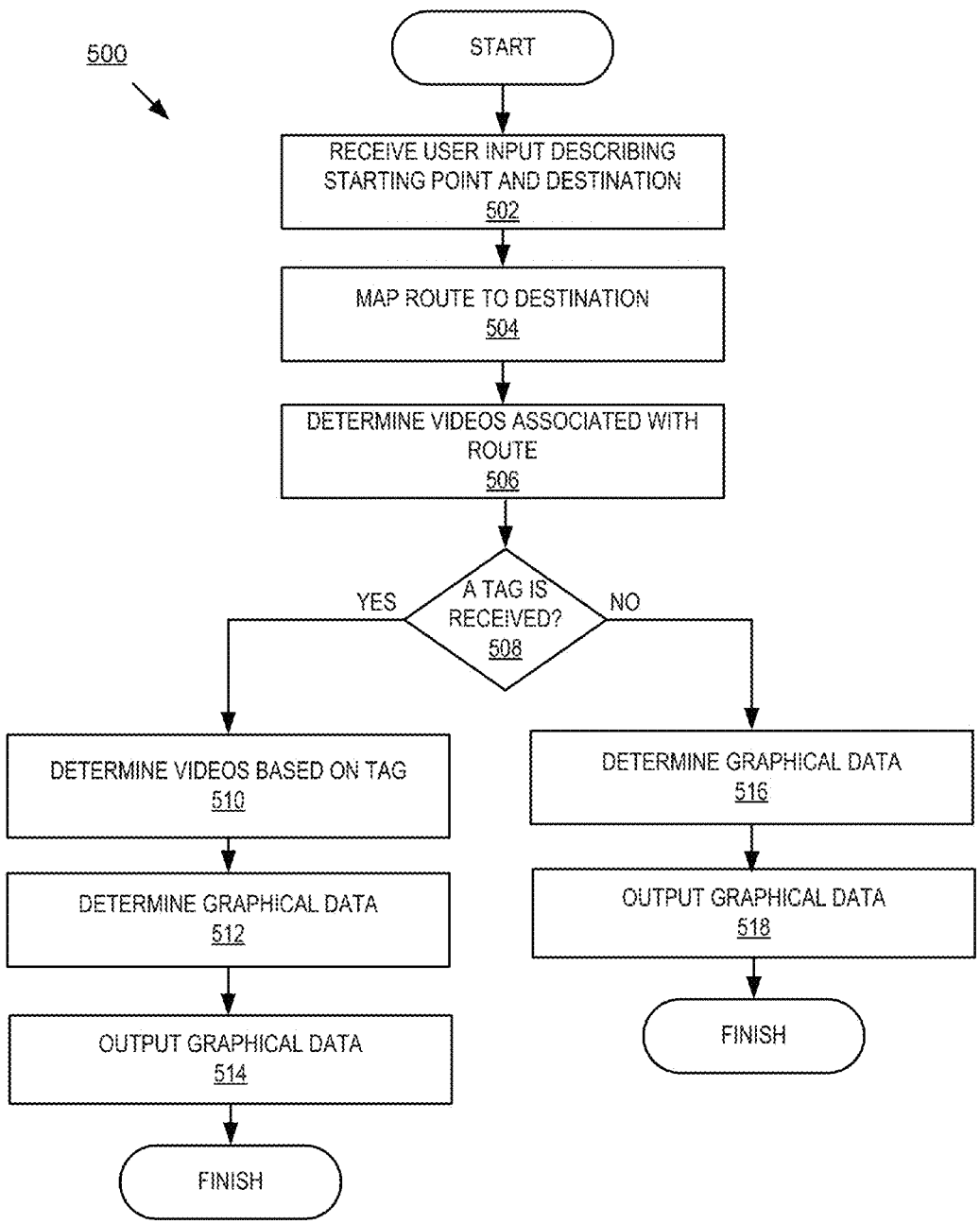
FIG. 5 is a flow diagram of a method for determining videos for a route in accordance with an embodiment.

FIG. 5 is a flow diagram depicting one embodiment of a method 500 implemented by the mapping module 193 for determining videos for a route. At step 502, the content hosting site 100 receives a user input describing a starting point and a destination. In one embodiment, the user input module 304 parses the user input and sends a parsing result including the starting point and the destination to the route module 312. At step 504, the route module 312 maps a route between the starting point to the destination. At step 506, the content retrieval module 306 determines one or more videos associated with the route. For example, the content retrieval module 306 determines one or more videos taken at geographic locations included in or close to the route.

At step 508, the content retrieval module 306 determines if a travelling tag is received from a user 125. If a travelling tag is determined to be received, then the method 500 proceeds to step 510. At step 510, the content retrieval module 306 determines one or more videos based at least in part on the received travelling tag. For example, the content retrieval module 306 determines videos associated with the route and also associated with the travelling tag. At step 512, the presentation module 110 determines graphical data for generating a user interface displaying the route and the videos associated with the route and also associated with the travelling tag on a client device 115. At step 514, the front end interface 102 outputs the graphical data to the client device 115. If a travelling tag is not determined to be received, then the method 500 moves to step 516. At step 516, the presentation module 110 determines graphical data for generating a user interface displaying the route and videos associated with the route (no matter what tag or tags they have) on a client device 115. At step 518, the front end interface 102 outputs the graphical data to the client device 115.

Figure 6:
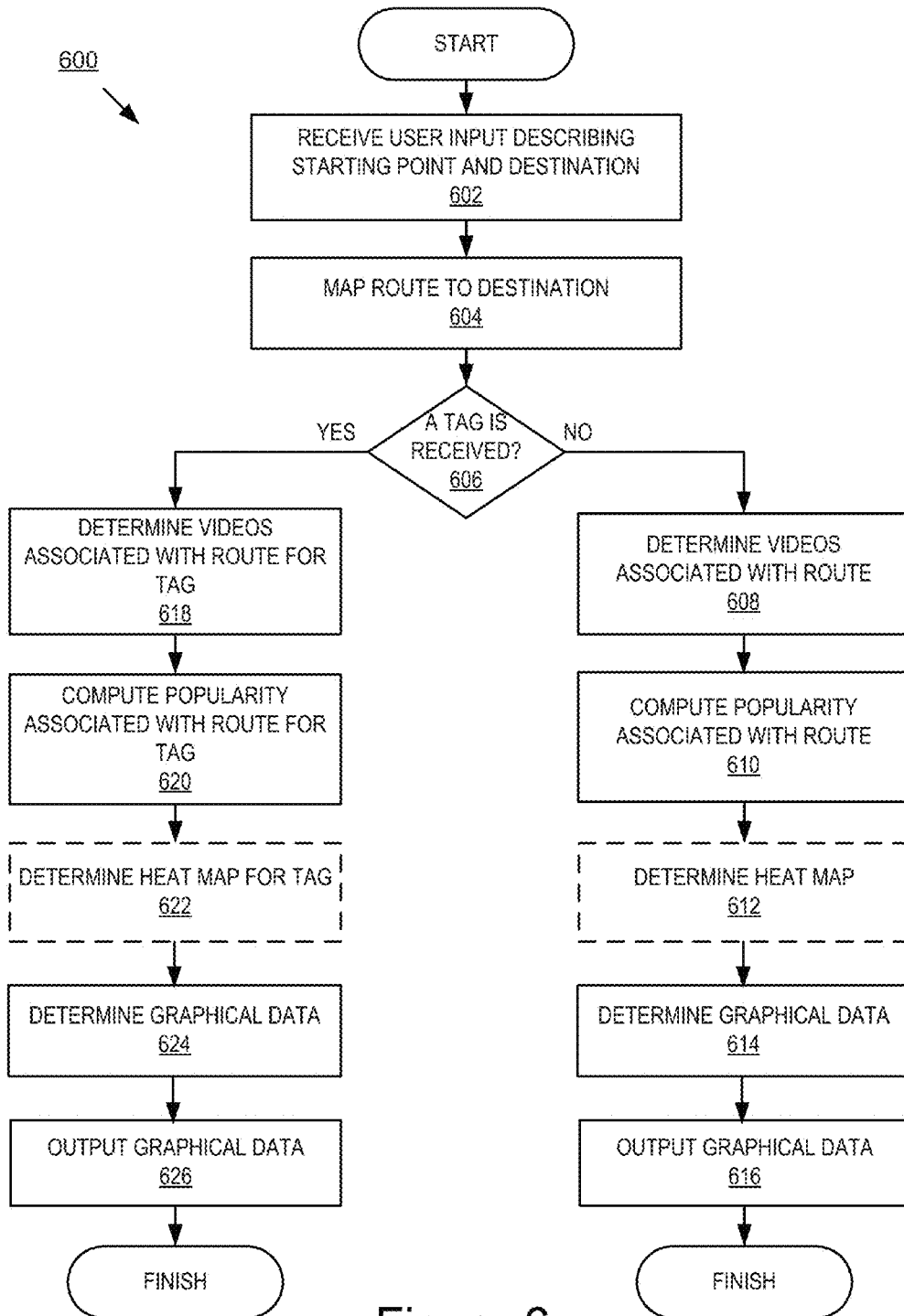
FIG. 6 is a flow diagram of a method for determining popularity for a route in accordance with an embodiment.

FIG. 6 is a flow diagram depicting one embodiment of a method 600 implemented by the mapping module 193 for determining popularity for a route. Method 600's steps 602 and 604 are the same as steps 502 and 504 for method 500 and will not be repeated herein. At step 606, the content retrieval module 306 determines if a travelling tag is received from a user 125. If a travelling tag is not determined to be received, then the method 600 moves to step 608. At step 608, the content retrieval module 306 determines one or more videos associated with a route planed by the route module 312 at the previous step 604. At step 610, the heat map module 310 computes popularity associated with the route based at least in part on the one or more videos associated with the route. In one embodiment, the heat map module 310 receives social data describing the videos associated with the route from the content retrieval module 306. The heat map module 310 determines popularity for the route based at least in part on the social data. At step 612, the heat map module 310 determines a heat map for a geographic map including the route. In one embodiment, the heat map describes densities of videos associated with geographic locations in the geographic map. The step 612 is depicted using a dashed line to indicate that it is an optional step for the method 600. In one embodiment, the method 600 does not generate a heat map. At step 614, the presentation module 110 determines graphical data for generating a user interface displaying the route, the popularity for the route and optionally the heat map for a geographic map including the route on a client device 115. At step 616, the front end interface 102 outputs the graphical data to the client device 115.

If a travelling tag is determined to be received at step 606, the method 600 proceeds to step 618. At step 618, the content retrieval module 306 determines one or more videos associated with the route and also associated with the travelling tag. For example, if a user 125 selects a traveling tag "lake", the content retrieval module 306 determines videos associated with the travelling tag "lake" and associated with the route. At step 620, the heat map module 310 computes popularity associated with the route for the travelling tag. In one embodiment, the heat map module 310 determines popularity for the route based at least in part on social data describing the videos determined by the content retrieval module 306 at step 618. At step 622, the heat map module 310 determines a heat map for the travelling tag associated with a geographic map including the route. The step 622 is depicted using a dashed line to indicate that it is an optional step for the method 600. In one embodiment, the method 600 does not generate a heat map for the travelling tag. At step 624, the presentation module 110 determines graphical data for generating a user interface displaying the route, the popularity for the route based at least in part on the travelling tag and optionally the heat map for the travelling tag associated with a geographic map including the route on a client device 115. At step 626, the front end interface 102 outputs the graphical data to the client device 115.

Figure 7:
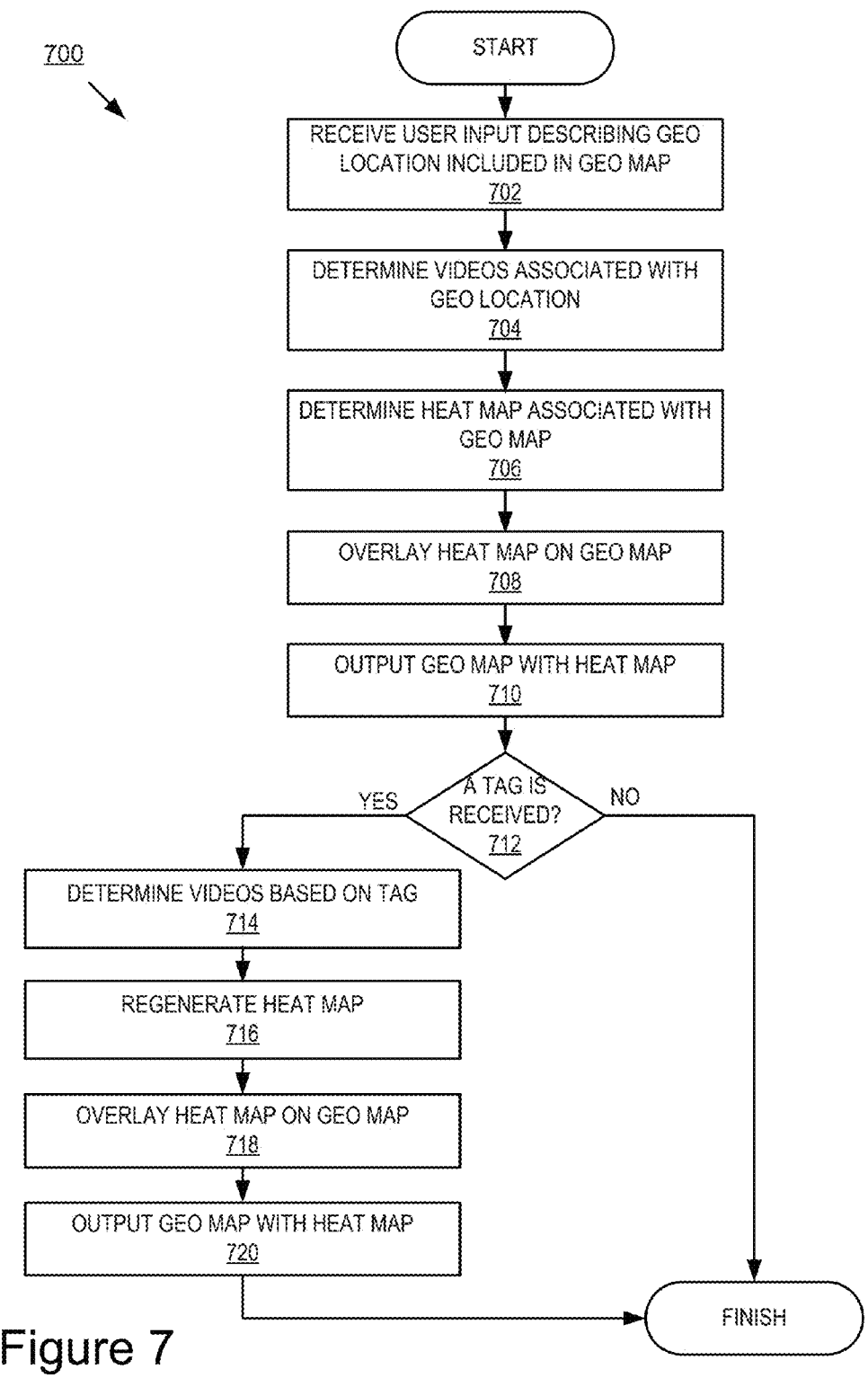
FIG. 7 is a flow diagram of a method for generating a heat map in accordance with an embodiment.

FIG. 7 is a flow diagram depicting one embodiment of a method 700 implemented by the mapping module 193 for generating a heat map. At step 702, the content hosting site 100 receives a user input describing a geographic location included in a geographic map. For example, a user 125 searches for "Utah." At step 704, the content retrieval module 306 determines one or more videos associated with the geographic location. For example, the content retrieval module 306 queries the geo maps 290 in the map database 199 for video IDs associated with the geographic location. In one embodiment, the content retrieval module 306 also determines videos associated with other geographic locations in the geographic map. At step 706, the heat map module 310 determines a heat map associated with the geographic map based at least in part on the one or more videos associated with the geographic locations included in the geographic map. For example, the heat map describes densities of the videos associated with the geographic locations in the geographic map. At step 708, the presentation module 110 overlays the heat map on the geographic map. At step 710, the front end interface 102 outputs the geographic map with the heat map to the client device 115.

At step 712, the content retrieval module 306 determines if a travelling tag is received from a user 125. If a travelling tag is not determined to be received, then the method 700 ends. If a travelling tag is determined to be received, then the method 700 proceeds to step 714. At step 714, the content retrieval module 306 determines one or more videos based at least in part on the received travelling tag. In one embodiment, the content retrieval module 306 determines videos associated with the geographic map and also associated with the received travelling tag. At step 716, the heat map module 310 regenerates a heat map for the received travelling tag associated with the geographic map based at least in part on the determined videos. At step 718, the presentation module 110 overlays the heat map on the geographic map. At step 720, the front end interface 102 outputs the geographic map with the heat map to the client device 115.

Examples of Graphical User Interfaces ("GUIs")

Figure 8:
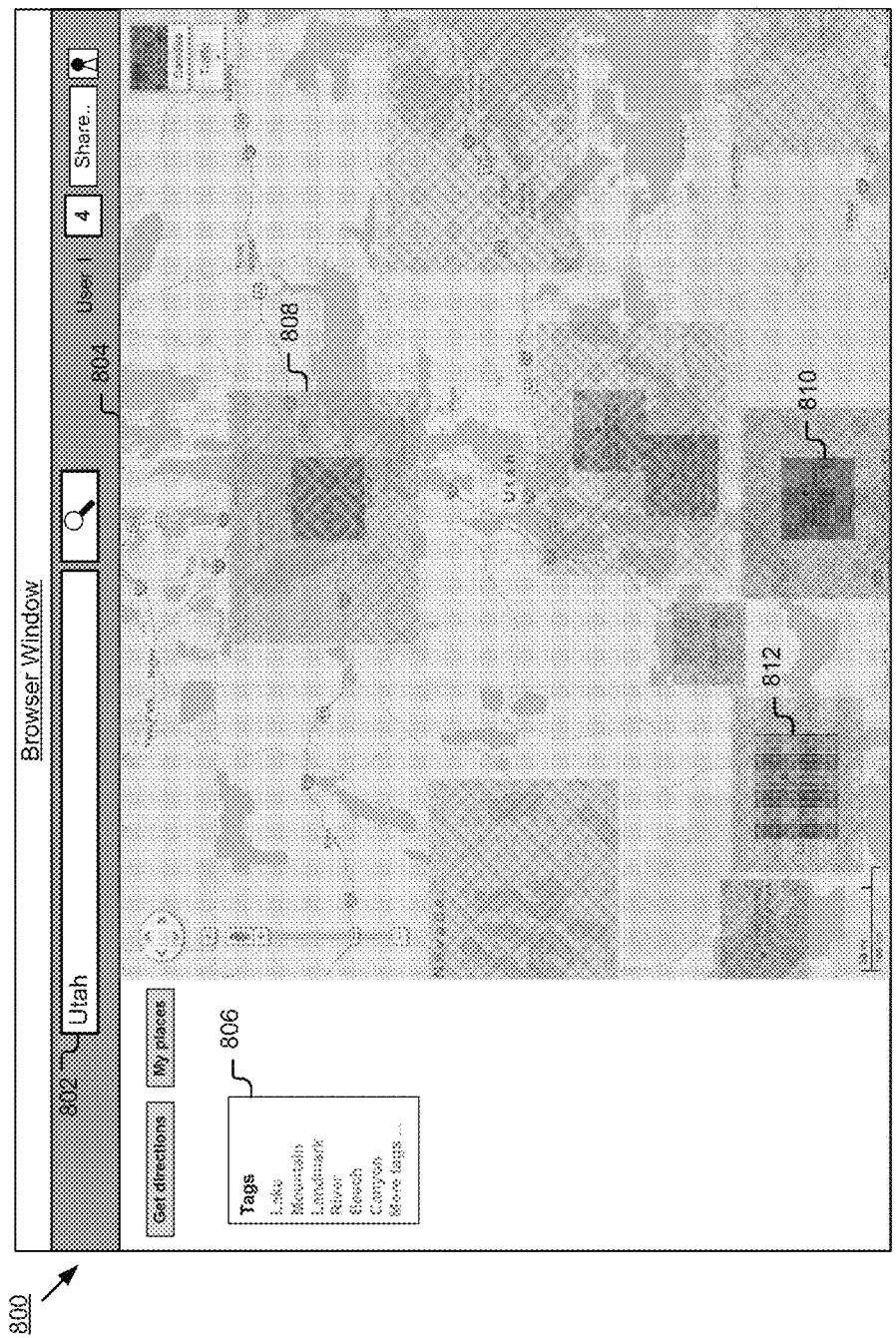
FIG. 8 is a graphic representation of a user interface displayed on a client device including a heat map in accordance with an embodiment.

FIG. 8 depicts an example of a GUI 800 including a heat map displayed on a client device 115. Element 802 is a graphical search box for a user 125 to input a search query. For example, the search box 802 enables a user 125 to input a geographic location (e.g., Utah). Element 804 is a graphical representation of a heat map overlaying on a geographic map. For example, the heat map 804 is a heat map generated by the heat map module 310 as described above with reference to FIG. 3. Element 806 is a graphical check list of travelling tags. Each item in the list 806 is clickable by a user 125 to select a travelling tag. Elements 808, 810, 812 are graphical colored areas included in the heat map 804. The colored areas 808, 810, 812 in the heat map 804 indicate different densities of videos for the geographic locations where the colored areas 808, 810, 812 are labeled. For example, the colored area 810 is darker than the colored area 808, which indicates that the density of videos for the geographic location 812 is higher than the density of videos for the geographic location 808.

Figure 9:
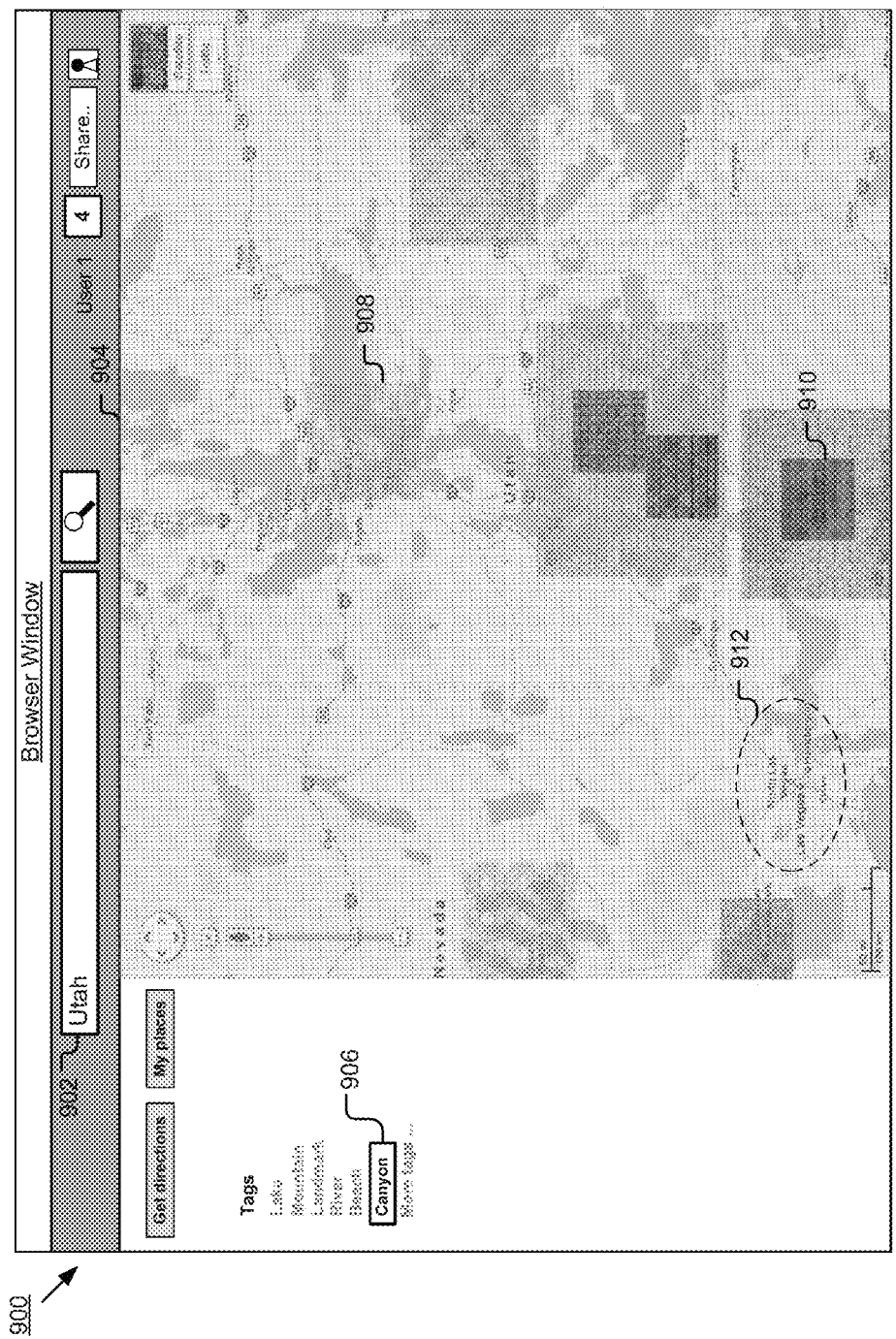
FIG. 9 is a graphic representation of a user interface displayed on a client device including a heat map for a tag in accordance with an embodiment.

FIG. 9 depicts an example of a GUI 900 including a heat map for a travelling tag displayed on a client device 115. Element 902 is a graphical search box for a user 125 to input a search query. For example, the search box 902 is the same as the search box 802 shown in FIG. 8. Element 904 is a graphical representation of a heat map for a travelling tag overlaying a geographic map. Element 906 is a graphical check button clickable by a user 125 to select the travelling tag "canyon." Elements 908 and 910 are graphical colored areas included in the heat map 904. The colored areas 908, 910 in the heat map for the travelling tag "canyon" 904 indicate different densities of videos associated with the travelling tag "canyon" for the geographic locations where the colored area 908, 910 are labeled. Element 912 is a graphical representation of an area having a changed color after the travelling tag "canyon" button 906 is clicked by the user 125. For example, the colored area 912 has a different color from the colored area 812 shown in FIG. 8 since the user 125 selects the travelling tag "canyon", which indicates that the geographic location 912 (812) has relatively less videos associated with the travelling tag "canyon", even though it has relatively more videos in general.

Figure 10:
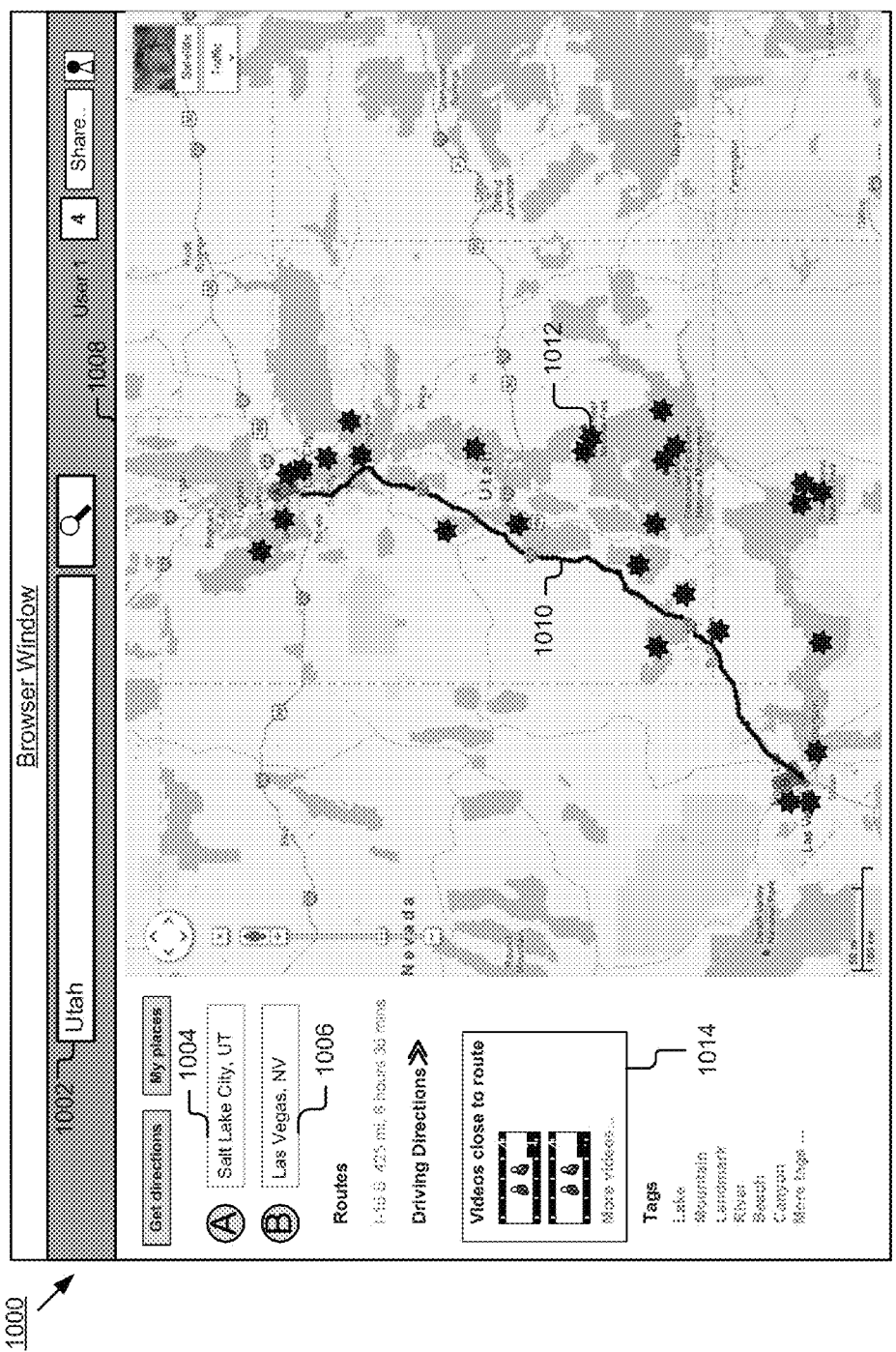
FIG. 10 is a graphic representation of a user interface displayed on a client device including a route and associated videos in accordance with an embodiment.

FIG. 10 depicts an example of a GUI 1000 including a route and associated videos displayed on a client device 115. Element 1002 is a graphical search box for a user 125 to input a search query. For example, the search box 1002 is the same as the search box 802 shown in FIG. 8 and the search box 902 shown in FIG. 9. Elements 1004, 1006 are graphical boxes for a user 125 to input a starting location and a destination respectively. Element 1008 is a graphical representation of a geographic map showing a route between the starting location and the destination specified in the boxes 1004, 1006, respectively, by the user 125. Element 1010 is a graphical representation of the route between the starting location and the destination. Element 1012 is a graphical mark indicating a certain number of videos associated with the geographic location in the geographic map 1008 where the mark 1012 is labeled. The mark 1012 is clickable by the user 125 to play one or more of the videos. Element 1014 is a graphical list of videos associated with the route 1010.

Figure 11:
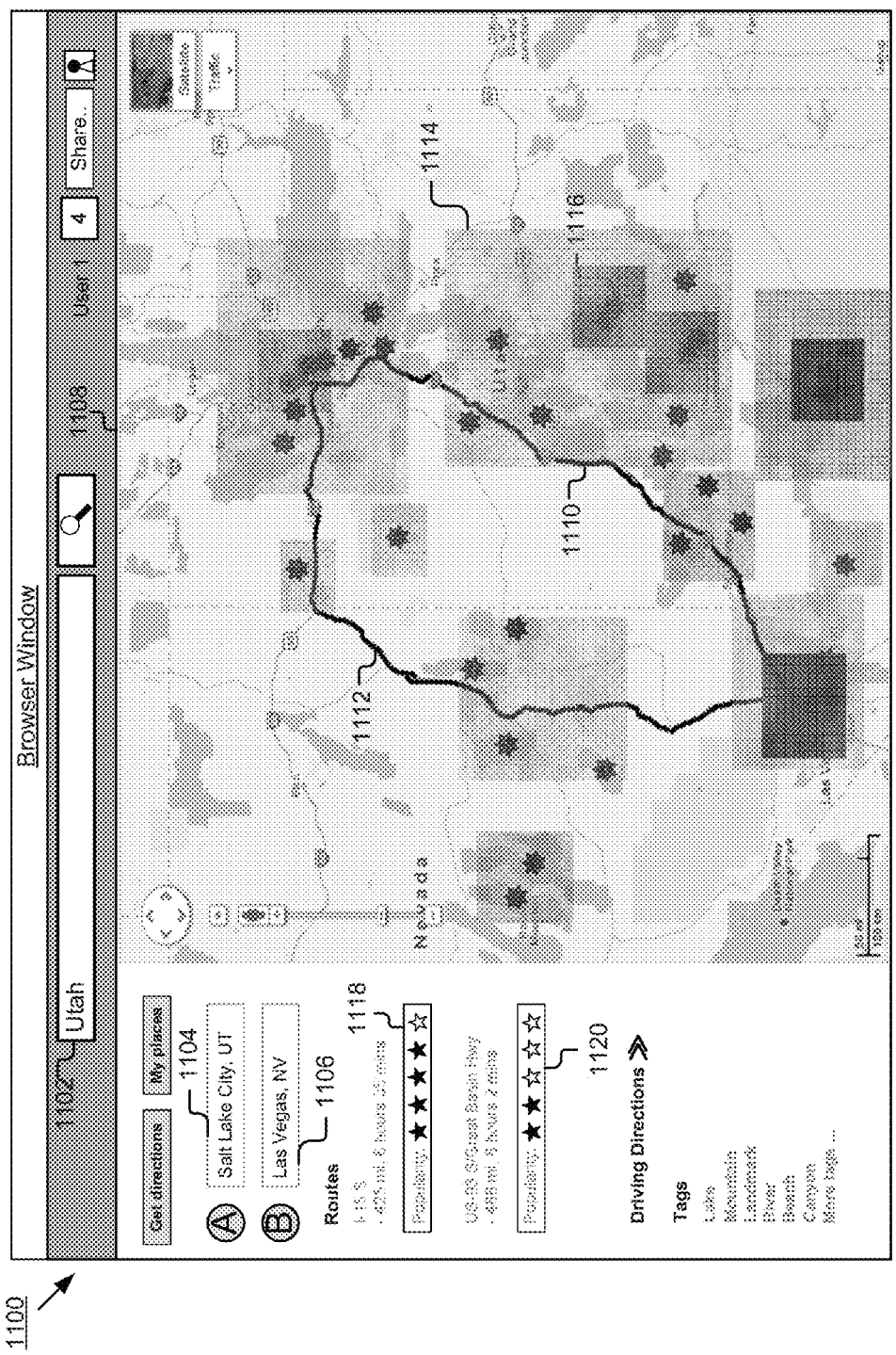
FIG. 11 is a graphic representation of a user interface displayed on a client device including a route and popularity for the route in accordance with another embodiment.

FIG. 11 depicts an example of a GUI 1100 including a route and popularity for the route displayed on a client device 115. Element 1102 is a graphical search box for a user 125 to input a search query. For example, the search box 1102 is the same as the search box 802 shown in FIG. 8, the search box 902 shown in FIG. 9 and the search box 1002 shown in FIG. 10. Elements 1104, 1106 are graphical boxes for a user 125 to input a starting location and a destination respectively. Element 1108 is a graphical representation of a geographic map showing two candidate routes between the starting location and the destination specified in the boxes 1104, 1106, respectively, by the user 125. Elements 1110, 1112 are graphical representations of the two candidate routes between the starting location and the destination. The geographic map 1108 also includes a heat map overlaying on it. Element 1114 is a graphical representation of a colored area included in the heat map that indicates a density of videos associated with the geographical location where the colored area 1114 is labeled. Element 1116 is a graphical mark indicating a certain number of videos associated with the geographic location in the geographic map 1108 where the mark 1116 is labeled. Elements 1118, 1120 are graphical representations for popularities of the two candidate routes 1110, 1112, respectively. For example, the popularities 1118, 1120 for the respective routes 1110, 1112 are represented by a number of solid stars.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification.

What is claimed is:

1. A method comprising:
   receiving a search query specifying routing data;
   identifying a first route and a first geographic location associated with the first route based on the routing data;
   determining that one or more first videos are associated with the first geographic location;
   calculating a first popularity for the first route based on interactions with the first videos by multiple user accounts at one or more systems that host the first videos; and
   generating, by one or more processors, graphical data for displaying a geographic map that describes the first route and the first popularity for the first route.

2. The method of claim 1, wherein the interactions comprise a number of views for the first videos, a number of like indications for the first videos, a number of dislike indications for the first videos, or a number of comments for the first videos.

3. A non-transitory computer program product comprising computer readable-media having instructions stored thereon that, when executed by one or more processors, cause the processors to perform operations comprising:
   receiving a search query specifying routing data;
   identifying a first route and a first geographic location associated with the first route based on the routing data;
   determining that one or more first videos are associated with the first geographic location;
   calculating a first popularity for the first route based on interactions with the first videos by multiple user accounts at one or more systems that host the first videos; and
   generating, by the processors, graphical data for displaying a geographic map that describes the first route and the first popularity for the first route.

4. The non-transitory computer program product of claim 3, wherein the operations further comprise:
   identifying a second route and a second geographic location associated with the second route based on the routing data;
   determining that one or more second videos are associated with the second geographic location; and
   calculating a second popularity for the second route based on interactions with the second videos by multiple user accounts at one or more systems that host the second videos, and wherein the graphical data for displaying the geographic map further describes the second route and the second popularity for the second route.

5. The non-transitory computer program product of claim 4, wherein the operations further comprise generating a heat map for the geographic map based on the first videos and the second videos, wherein the heat map indicates a first density of the first videos associated with the first geographic location and a second density of the second videos associated with the second geographic location, and wherein the graphical data for displaying the geographic map further describes the heat map.

6. The non-transitory computer program product of claim 5, wherein the operations further comprise:
   identifying a third geographic location associated with the first route and the second route based on the routing data; and
   determining that one or more third videos are associated with the third geographic location, wherein calculating the first popularity and the second popularity is further based on interactions with the third videos by multiple user accounts at one or more systems that host the third videos, wherein generating the heat map for the geographic map is further based on the third videos, and wherein the heat map indicates a third density of the third videos associated with the third geographic location.

7. The method of claim 1, further comprising:
   identifying a second route and a second geographic location associated with the second route based on the routing data;
   determining that one or more second videos are associated with the second geographic location; and
   calculating a second popularity for the second route based on interactions with the second videos by multiple user accounts at one or more systems that host the second videos, and wherein the graphical data for displaying the geographic map further describes the second route and the second popularity for the second route.

8. The method of claim 7, further comprising generating a heat map for the geographic map based on the first videos and the second videos, wherein the heat map indicates a first density of the first videos associated with the first geographic location and a second density of the second videos associated with the second geographic location, and wherein the graphical data for displaying the geographic map further describes the heat map.

9. The method of claim 8, further comprising:
   identifying a third geographic location associated with the first route and the second route based on the routing data; and
   determining that one or more third videos are associated with the third geographic location, wherein calculating the first popularity and the second popularity is further based on interactions with the third videos by multiple user accounts at one or more systems that host the third videos, wherein generating the heat map for the geographic map is further based on the third videos, and wherein the heat map indicates a third density of the third videos associated with the third geographic location.

10. The non-transitory computer program product of claim 3, wherein the interactions comprise a number of views for the first videos, a number of like indications for the first videos, a number of dislike indications for the first videos, or a number of comments for the first videos.

11. A system comprising:
    an interface to receive a search query specifying routing data;
    one or more processors to communicate with the interface to:
      identify a first route and a first geographic location associated with the first route based on the routing data;
      determine that one or more first videos are associated with the first geographic location;
      calculate a first popularity for the first route based on interactions with the first videos by multiple user accounts at one or more systems that host the first videos; and
      generate graphical data for displaying a geographic map that describes the first route and the first popularity for the first route.

12. The system of claim 11, wherein the processors are further to generate a heat map for the geographic map based on the first videos and the second videos, wherein the heat map indicates a first density of the first videos associated with the first geographic location and a second density of the second videos associated with the second geographic location, and wherein the graphical data for displaying the geographic map further describes the heat map.

13. The system of claim 12, wherein the processors are further to:
identify a third geographic location associated with the first route and the second route based on the routing data; and
determine that one or more third videos are associated with the third geographic location, wherein the calculation of the first popularity and the second popularity is further based on interactions with the third videos by multiple user accounts at one or more systems that host the third videos, wherein the generation of the heat map for the geographic map is further based on the third videos, and wherein the heat map indicates a third density of the third videos associated with the third geographic location.

14. The system of claim 11, wherein the interactions comprise a number of views for the first videos, a number of like indications for the first videos, a number of dislike indications for the first videos, or a number of comments for the first videos.

15. The system of claim 11, wherein the processors are further to:
identify a second route and a second geographic location associated with the second route based on the routing data;
determine that one or more second videos are associated with the second geographic location; and
calculate a second popularity for the second route based on interactions with the second videos by multiple user accounts at one or more systems that host the second videos, and wherein the graphical data for displaying the geographic map further describes the second route and the second popularity for the second route.

* * * * *